United States Patent [19]
Herreid et al.

[11] Patent Number: 6,126,979
[45] Date of Patent: Oct. 3, 2000

[54] METHOD FOR MAKING FAST DISSOLVING BOUILLON CUBES

[75] Inventors: Richard M. Herreid; Vernon E. Lippert, both of Austin, Minn.

[73] Assignee: Hormel Foods, LLC, Austin, Minn.

[21] Appl. No.: 09/165,963

[22] Filed: Oct. 2, 1998

[51] Int. Cl.[7] ..................................................... A23L 1/231
[52] U.S. Cl. ........................... 426/285; 426/274; 426/453; 426/454; 426/455; 426/456; 426/650
[58] Field of Search .................................. 426/285, 274, 426/453, 454, 455, 650, 456

[56] References Cited

U.S. PATENT DOCUMENTS

| | | | |
|---|---|---|---|
| 3,000,743 | 9/1961 | Tolin | 99/140 |
| 3,769,029 | 10/1973 | Ganz | 426/342 |
| 3,840,674 | 10/1974 | Mosher | 426/65 |
| 4,031,238 | 6/1977 | Reid et al. | 426/285 |
| 4,073,961 | 2/1978 | Gasser et al. | 426/589 |
| 4,194,017 | 3/1980 | Poiger et al. | 426/533 |
| 4,546,004 | 10/1985 | Rhee et al. | 426/656 |
| 5,077,062 | 12/1991 | Ernster | 426/46 |

OTHER PUBLICATIONS

Product Packaging Bovril Beef Bouillon, 1995.
Product Packaging OXO Beef Bouillon, 1995.

*Primary Examiner*—Milton Cano
*Attorney, Agent, or Firm*—Mau & Krull, P.A.

[57] ABSTRACT

A method for producing a fast dissolving low fat bouillon cube includes providing a bouillon powder which is free-flowing to a die having a residual of water on a surface. The bouillon powder is compressed at low pressure, thereby forming a fast dissolving bouillon cube.

12 Claims, 2 Drawing Sheets

METHOD FOR MAKING FAST DISSOLVING BOUILLON CUBES

BACKGROUND OF THE INVENTION

1. Field of the Invention

This invention relates generally to bouillon cubes, and more particularly to a low density, low fat bouillon cube that is fast dissolving.

2. Description of the Prior Art

The use of bouillon cubes to provide salt and meat flavorings in soups, gravies, sauces and other similar food products is well known. A first type of cube is a high fat content cube which would contain approximately 20 to 30 percent partially hydrogenated vegetable fat. Such a cube is presently being made by Knorr. These cubes dissolve relatively rapidly in hot water, i.e., about 30 seconds. These cubes dissolve rapidly because the heat of the water melts the fat holding the cubes together. However, a major disadvantage of such a type of cube is that the high fat content leaves a fat layer on the top of the hot water when the cube dissolves.

A second type of bouillon cube is produced by compressing the bouillon powder under greater pressure to produce a denser bouillon cube. Such cubes are presently being produced by Herb-Ox, Wyler and Maggi. These cubes are made by compressing the bouillon powder using a modified pharmaceutical-type tablet press. The cubes usually contain only 1 to 2 percent fat but may contain up to 10 percent fat. Such cubes take several minutes to dissolve in hot water.

Finally, there are cubes currently being sold by Brooke Bond Foods, which is a subsidiary of Unilever and by Bovril, which is a subsidiary of CPC International. These cubes are somewhat porous and do dissolve in about 30 seconds in hot water. However, it is presently not known by applicants how such cubes are produced.

The present invention provides for a method of making a low fat bouillon cube which quickly dissolves in hot water by making a cube which is sufficiently porous so that the water may get inside of the cube so that it will rapidly disintegrate. The cube also is sufficiently strong to enable handling by wrapping and filling equipment.

SUMMARY OF THE INVENTION

The invention is a method of producing a fast dissolving, low fat bouillon cube which includes providing a bouillon powder. The powder has substantially no water added to it. A compression surface of a punch is cleaned with water, leaving a residue of water on the compression surface. A die is filled with bouillon powder and the bouillon powder within the die is compressed with the compression surface of the punch to form a low density fast dissolving bouillon cube.

In another embodiment, the invention is a method of producing a fast dissolving, low density bouillon cube. The method includes filling a hopper with a free-flowing bouillon powder. A compression surface of a punch is cleaned with water, thereby leaving a residue of water on the compression surface. The compression surface is movable within a four-sided die. The compression surface extends out of an open top when being cleaned. The compression surface is moved to form a bottom of the die and free-flowing bouillon powder from the hopper is then filled into the die. The compression surface is moved toward the top of the die, thereby compressing the powder against a compression member to form a low density, fast dissolving bouillon cube.

In another embodiment, the invention is a method of producing a fast dissolving low density bouillon cube. The cube is formed by applying a residue coating of water to an inside surface of a die, the inside surface defining a portion of a cavity formed by the die. The cavity of the die is filled with a free-flowing bouillon powder. A force of less than 3,000 pounds per square inch is applied to the powder, thereby forming a low density, fast dissolving bouillon cube.

DETAILED DESCRIPTION OF THE PREFERRED EMBODIMENT

The present invention is a method of making a quick dissolving bouillon cube. The method of making the bouillon cube involves the use of a cuber or tableter such as the ELBA type C cubing machine. Such a cubing machine, generally designated at 10, is available from Elba Sales B.V. of Huizen, Holland. Such a cubing machine 10 is well known for making sugar cubes and the machine 10 is readily available and described in its product literature, which is hereby incorporated for reference for background information on the cuber 10. The term low fat, when used in this application, refers to a fat content of less than 2 percent.

The cuber 10 will be described generally with respect to the making of granular sugar cubes so as to provide a background as to the modifications necessary to enable the cuber 10 to produce a fast dissolving bouillon cube.

Figure 4:
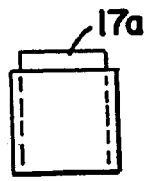
FIG. 4 is a side elevational view of the die and punch, the punch being in an extended position.
Figure 5:
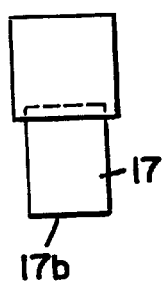
FIG. 5 is a side elevational view of the die and punch with the punch being retracted to a filled position.

Dry, granulated sugar is gravity fed into a filler hopper 11. From the filler hopper 11, the sugar falls into the mixing chamber 12. In the mixing chamber 12, it is mixed by a plurality of rotating mixer spindles 13 along with a quantity of water which is supplied through an inlet port 14. Beneath the mixer spindles 13 are three filler spindles 15 with offset fingers which press the sugar-and-water mixture into the pockets of the die/mold 16. This area is the loading area 15a. The mold 16 has four sides 16a through d which are operatively connected to form a die 16 having an open top and bottom. A punch 17 is mounted for reciprocal motion inside of the die 16. In FIGS. 4 and 5, the punch 17 is shown, for illustrative purposes only, as being smaller than the inner cavity of the die 16. However, in practice the punch 17 is sized only slightly smaller than the die 16. In FIG. 4, it can be seen that the compression surface 17a of the punch is extending above the die 16. In FIG. 5, the punch 17 is retracted to the position where the die 16 is filled.

Figure 1:
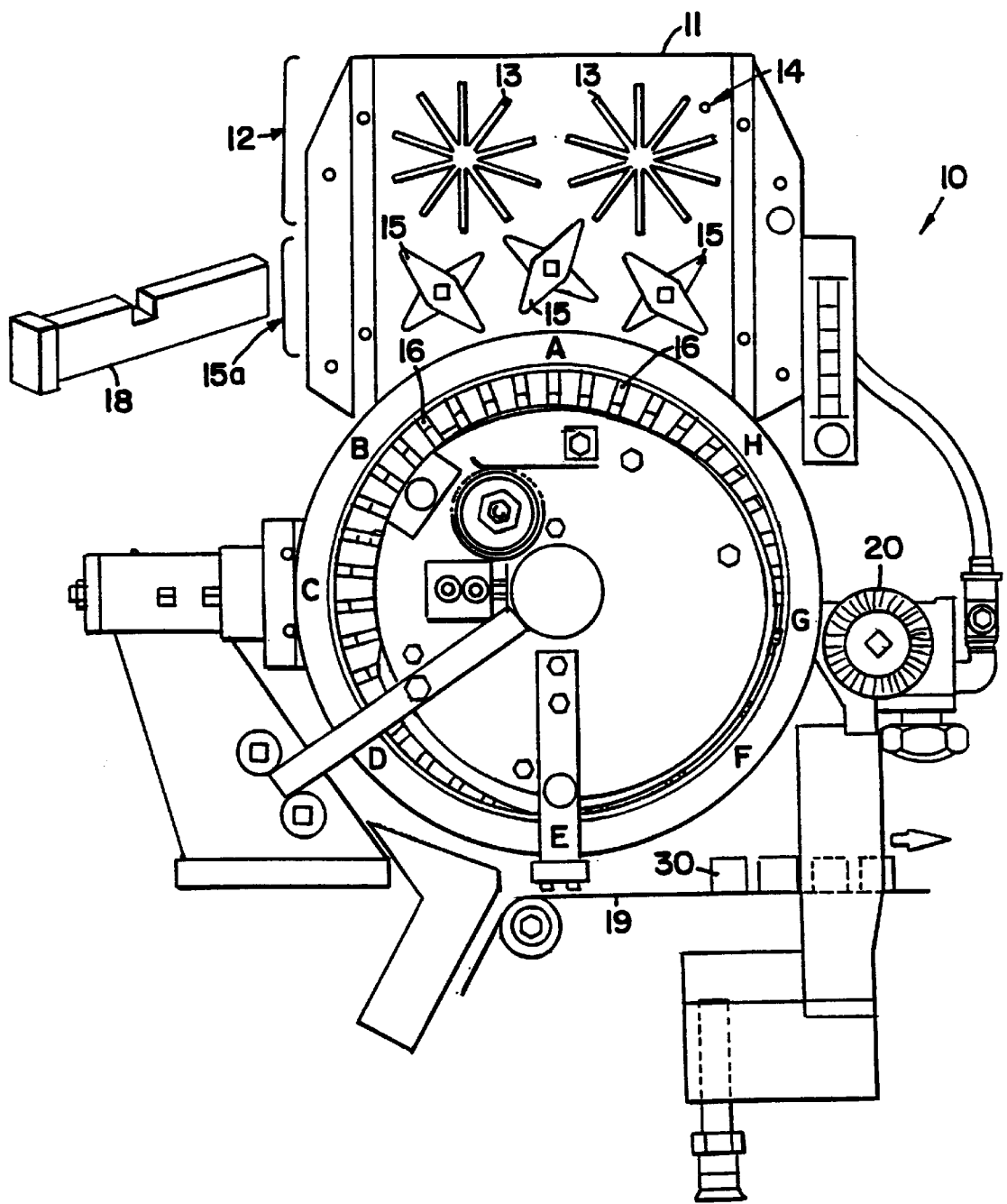
FIG. 1 is a schematic view of a cubing machine used for the method of the present invention.

The operation of the rotating dies 16 and punches 17 is illustrated in FIG. 1. The die 16, which houses the sliding punches 17, rotates in an counter-clockwise direction around a fixed center plate assembly.

At position A, cam segments (not shown) mounted on the center plate allow each punch 17 to retract fully into the die 16 (as shown in FIG. 5) enabling sugar to fill into the cavity of the die 16. The inner end 17b of the punch 17 then rides over a filler roller (not shown) which raises the punch again slightly, thereby pushing a little sugar back out of the die 16.

The volume of fill, and therefore the ultimate cube weight can be adjusted. At position B, the die 16 has now been filled with uncompressed sugar.

At position C, the inner end of 17b of the punch 17 rides over an adjustable pressure roller forcing the punch outward through the die 16 and compresses the sugar against the counter pressure block 18. This block prevents the sugar and water mixture from escaping the die cavity 16. At position D, the punch 17 is forced further outward through the die 16, gradually forcing the compressed, wet sugar cube out of the mold. At position E, the sugar cube has emerged completely from the die 16 and an adjustable detacher arm (not shown) nudges the cube to detach from the punch 17 and allows it to drop onto the wet-cube conveyor 19.

At position F, the punch begins to ride down over the receding cam face (not shown) of the center plate (not shown) and retracts into the mold until its top surface still protrudes approximately 1 millimeter out of the mold 16 (as shown in FIG. 4).

At position G, any sugar residue is cleaned off of the compression surface 1 7a of the punch. A rotating brush 20 located in a metal housing (not shown) which is gravity fed with clean water directly from a water supply via a water shut-off valve (not shown). A plastic scraper (not shown) is located at the lower lip (not shown) of the metal housing and this removes the residue from the die 16 and punch 17. The wet brush 20 then cleans the compression surface 17a of the punch 17 which is held against the brush by light pressure from a leaf spring (not shown) mounted at this point on the center plate.

At position H, the receding compression surface 17a is retracted fully into the mold as it proceeds toward position A, ready to receive more sugar for the next cycle.

The process for producing a quick dissolving bouillon cube involves compressing bouillon powder in a die with a wet surface under low pressure. Bouillon powder is placed into the hopper 11. The water inlet port 14 is closed so as to not introduce water into the mixing chamber 12. The bouillon powder may have a variety of ingredients. One such powder would include:

| Salt | 50% |
| Hydrolyzed Vegetable Protein | 30% |
| Dextrose | 15% |
| Spices, Flavoring, and Coloring | 5% |

Typical ranges for the major ingredients would be as follows:

| Salt | 30–70% |
| Hydrolyzed Vegetable Protein | 10–50% |
| Dextrose | 0–30% |
| Spices, Flavoring, and Coloring | 0–15% |

The spices and flavoring typically consist of ingredients such as:

Pepper, Basil and Oregano

Dried Onion, Garlic, Tomato and Celery

Dried Meats or Meat Extracts

Glutamates and Nucleotides

Commercially Available Flavorings Such as Chicken or Beef Flavors

Typical colorings would be natural colors such as turmeric or paprika. In addition, FD&C artificial colors or caramel colors may be utilized.

At position G, the compression surface 17a has been cleaned with the brush 20 and water is left on the compression surface 17a. Then, as the cubing machine 10 revolves forward, the punch 17 is retracted into the die 16 and the compression surface 17a now is at the bottom of the die 16 when at position A. By being moved from the top of the die 16 to the bottom of the die 16, the compression surface 17a, with its residue of water, leaves some of the residue of water on the inside surface of the sides 16a–d. Then at position A, the bouillon powder is filled into the die 16. Then as it progresses to position C, the punch 17 moves outward and slightly compresses the bouillon powder. Then as the cuber 10 moves to position E, the cube 30 is pushed out of the die onto the conveyor 19. From the cube conveyor 19, the cubes travel to a drying conveyor 40. Underneath the drying conveyor 40 is a steam pipe 41. The steam pipe 41 has a plurality of openings through which steam is emitted. The steam envelopes the cubes 30 before they travel on the drying conveyor 40 into the dryer 42. It is also understood that cooler water may be used in the form of a mist or fog. The purpose of the steam will be discussed more fully hereafter. The dryer or drying tunnel 42 is at a temperature and time sufficient to dry the cubes 30. Applicants have found that a temperature of 225° F. for approximately 12 minutes is adequate for such a purpose. Then, after exiting the dryer 42, the cubes are cooled to room temperature by suitable means such as a cooling fan. Then, the cubes may be handled and packed for shipment. The pressure used to form the cubes is relatively low, i.e., in the range of 2,500–3,000 p.s.i., the exact pressure being difficult to measure. Typical prior art cubes are made with pressures in the range of 10,000 p.s.i., which require a special set-up for the machinery.

Moisture

In order to note the effect of water added to the bouillon in the cuber at various positions, Applicants tried several methods of adding water. The bouillon used was the same formula as set forth in Example 1 and the cuber was set up and operated in the same manner. When water was added at the clean-off brush only, as done in Example 1, the cubes were formed uniformly without any defective cubes. The dried cubes dissolved in hot water (approximately 190° F.) in 30 seconds. In another test, water was added at both the clean-off brush as noted above and also in the water addition port in the mixing chamber as required when making sugar cubes. Water was added at approximately 0.6 percent of the bouillon weight. Initially, the cubes produced were uniform with no defects, but within a few minutes, they were 50 percent defective. About 20 minutes later, the cuber stopped completely. On opening the mixing hopper, the bouillon was slightly sticky and packed around the mixing and loading paddles so that they would not move and thus stop the motor.

When no water was added, the bouillon powder formed fragile cubes with about 50 percent broken cubes after transferring to the drying conveyor belt. The fill was increased to the maximum level to make the hardest cubes possible with no improvement in the defective rate. The cubes were very fragile both before and after the drying tunnel. The cubes could not be handled without breaking.

Finally, water was added to the bouillon cube prior to the cuber. Thirty pounds of dry bouillon powder was put into a Hobart bowl mixer with a paddle-mixing arm. While the bouillon was mixed at a medium speed, 88 ml of water was slowly sprayed onto the bouillon (0.65 percent of bouillon weight). The damp bouillon was put into the feed hopper of the cuber with the water being added at the clean-off brush only. The damp bouillon would not feed into the mixing chamber so no satisfactory cubes were produced.

The cubes of the present invention are "quick-dissolving", meaning that they dissolve in less than 60 seconds in water having a temperature of 190° F. and stirred moderate until the cube was no longer visible.

It can therefore be seen that the manner in which the water is added to the bouillon is critical to the present invention. As noted in the preceding paragraph, adding water to the bouillon powder prior to cubing caused problems with correctly forming cubes. However, it appears that the major limiting factor is not the amount of moisture in the bouillon, but rather the limiting factor is the flow characteristics of the bouillon powder. The requirement for correct cube formation is that the bouillon powder flows freely without sticking during the mixing action of the mixing and filling zones of the cubing machine 10. A funnel flow method was used to measure flow characteristics of bouillon powder with varying moisture levels. The results of the bouillon moisture, funnel flow, and cubing tests are set forth in Table 1.

TABLE 1

| | Bouillon Treatment | Bouillon Moisture (%) | Funnel Flow Time (secs) | Cubing Results |
|---|---|---|---|---|
| A | Dry Bouillon | 1.5 | 35 | Good Cubes |
| B | Water Added Within Hour of Cubing | 1.8 | 32 | Good Cubes |
| C | Water Added Within Hour of Cubing | 2.3 | >120 | 75% Defective Cubes |
| D | Vacuum Granulated bouillon | 2.7 | 32 | Good Cubes |
| E | Vacuum Granulated Bouillon | 3.3 | 35 | Good Cubes |
| F | Water Added Within Hour of Cubing | 3.3 | >120 | No Cubes - Clogged Mixing Zone |
| G | Water Added within Hour of Cubing | 1.93 | 105 | Good - Difficult to Feed |

The results of Table 1 show that the way the moisture is added is as important as the amount of moisture. Samples C and E had moisture added shortly before cubing and the bouillon was sticky and did not flow well so that it would not cube successfully. However, when the bouillon was vacuum granulated, there were still good flow properties and good cubes were formed. When used in this application and the claims, "free-flowing" refers to bouillon powder that has a funnel flow time of less than 120 seconds, preferably less than 60 seconds, and most preferably 35 seconds or less. The time refers to a funnel flow test that uses a plastic Imhoff Setting Cone which is 45 cm tall, 10.2 cm diameter on the wide end, and 0.8 cm diameter opening on the narrow ends of the cone. 250 grams of bouillon powder is added to the cone with the narrow opening plug. In electrical vibrator is held against the side of the cone as the narrow opening is unplugged and a timer is started. The funnel flow is the time it takes for the 250 ml of bouillon powder to flow through the cone.

Density

The density of the cubes 30, made according to the present invention, is less than 1.4 grams per cubic centimeter. More preferably, the density range is from 1.1 to 1.2 grams per cubic centimeter. The density of the cubes is a good indicator of the dissolving time. A density of less than 1.4 grams per cubic centimeter provides for a quick dissolving (i.e., 60 seconds or less dissolving time) bouillon cube.

As previously discussed, the pressure on the ELBA cuber is difficult to measure precisely. Tests were run using a manual press in order to determine the resulting densities at various pressures. The die used had a 0.5 inch diameter cylinder with a removable bottom and a tight fitting piston. The cubes were made putting four grams of bouillon powder in the die and pressing the piston with a measured force. The force was applied with the Instron for forces less than 1,000 pounds and by a hydraulic press for forces greater than 1,000 pounds. The piston was pressed at a uniform rate until the force reached the target. At the time, it was released. The following is the results of using this method to prepare various bouillon cubes. All cubes were made with the formula set forth in Example 1. The powder (or a 50% portion thereof) was agglomerated first, which tends to make the powder flow more freely.

TABLE 2

| Bouillon Cube Type | Pressure (p.s.i.) | Density (g/cc) | Dissolving Time (seconds) |
|---|---|---|---|
| Chicken | | | |
| 100% Agglomerated | 1,300 | 1.21 | 19 |
| 100% Agglomerated | 2,800 | 1.36 | 35 |
| 100% Agglomerated | 4,300 | 1.44 | 68 |
| 100% Agglomerated | 7,600 | 1.63 | 130 |
| 100% Agglomerated | 10,200 | 1.67 | 143 |
| Chicken | | | |
| 50% Agglomerated | 1,300 | 1.15 | 19 |
| 50% Agglomerated | 2,800 | 1.25 | 33 |
| 50% Agglomerated | 4,300 | 1.35 | 48 |
| 50% Agglomerated | 7,600 | 1.48 | 88 |
| 50% Agglomerated | 10,200 | 1.57 | 120 |
| Beef | | | |
| 50% Agglomerated | 1,300 | 1.22 | 34 |
| 50% Agglomerated | 2,800 | 1.40 | 63 |
| 50% Agglomerated | 4,300 | 1.45 | 93 |
| 50% Agglomerated | 7,600 | 1.61 | 118 |
| 50% Agglomerated | 10,200 | 1.69 | 149 |

It can be seen that for densities of 1.4 grams per cubic centimeter or greater the dissolving time was greater than 60 seconds.

It can therefore be seen that the present invention allows for a low density cube to be made which is both quick dissolving and sufficiently firm to be handled, packaged, and transported to the consumer without breaking. The present invention provides for a method of making a quick dissolving cube which has a low fat content, which previously was not available by prior art methods. However, it is not just the low density that allows for the method of the present invention to be successful. If there is not water on the outside of the cubes, supplied by the die, the cubes will not be hard enough to withstand handling.

EXAMPLE 1

Basic Quick Dissolving Bouillon Cube Process

Chicken Flavored bouillon powder made up of the following ingredients was put into the feed hopper of an ELBA Type C sugar cube machine.

| | |
|---|---|
| Salt | 50% |
| Hydrolyzed Vegetable Protein | 30% |
| Dextrose | 15% |
| Spices, Flavoring, and Coloring | 5% |

The cubing machine was set up with punches and dies to make cubes approximately 15 mm in size. The fill setting (M on FIG. 1) was set at about 50 percent of maximum.

As the cubes dropped off the die wheel onto the transfer conveyor they were moved to the heating/drying tunnel conveyor. The heating/drying tunnel had a temperature set point of about 225° F. and the cubes were in the tunnel for about 12 minutes. The cubes then traveled under a cooling fan for about 3 minutes where they were cooled to room temperature.

The composition, size and weight of the finished cubes were measured as well as the amount of time necessary to dissolve the cubes with stirring in hot (190° F.) water. For comparison, these measurements for commercial bouillon cubes are given in Table 3.

TABLE 3

| | Example 1 | Bouillon Cube #1 (Herb Ox Chk) | Bouillon Cube #2 (Wyler Chk) | Bouillon Cube #3 (Knorr Chk) |
|---|---|---|---|---|
| Dissolving Time (seconds) | 29 | 187 | 173 | 70 |
| Density | 1.14 | 1.55 | 1.54 | 1.21 |
| Cube Wt (g) | 4.0 | 4.1 | 4.0 | 10.6 |
| Fat (%) | 1.3 | 1.2 | 4.9 | 23.4 |
| Moisture | 1.6 | 3.3 | 2.6 | 3.1 |

The cube dissolved quickly because it is somewhat porous and water can penetrate the cube and allow it to disintegrate and dissolve.

EXAMPLE 2

Quick Dissolving Cubes From Different Types of Bouillon

Beef, chicken and vegetable flavored bouillons were used to make quick dissolving cubes. The carbohydrate in the bouillon formulas was also varied between dextrose and sucrose.

The process of Example 1 was used with the bouillon formulas in Table 4.

TABLE 4

| | Chicken-1 | Chicken-2 | Beef | Vegetable |
|---|---|---|---|---|
| Salt | 49% | 49% | 50% | 45% |
| Dextrose | 16% | — | 15% | 16% |
| Sucrose | — | 16% | — | — |
| Light HVP | 30% | 30% | — | — |
| Dark HVP | — | — | 30% | 30% |
| Flavoring/Coloring | 5% | 5% | 5% | 9% |
| Cubing Result | Good | Good | Good | Good |
| Cube Dissolving Time (secs) | 27 | 28 | 40 | 41 |

EXAMPLE 3

Use of Air Jet to Control Water from Clean-Off Brush

The cubes 30 may have a mottled coloring depending on the amount of coloring added to the formula. With coloring such as caramel color added to the formula, the water on the die surface dissolves some of the caramel coloring on the cube surface and leaves a dark area. Since water on the die is not uniformly distributed, this results in a mottled appearance. By reducing the amount of water on the compression surface, this mottling effect can be significantly reduced. Also, by adjusting the amount of water left on the compression surface 17a, the hardness of the cubes may by varied.

The ELBA cuber was set up as in Example 1 with a modification to add an air jet positioned just above the clean-off brush (half way between position G and H on FIG. 1). This air jet blows off some of the water remaining on the die wheel after the punches have been cleaned by the clean-off brush. This allows some control of the water left on the die depending on the air pressure used.

The results of a test with the chicken bouillon formula of Example 1 containing dry caramel coloring using varying air pressure on the air jet are given in Table 5. Mottling is measured on a scale of 1 to 5 with 1=no mottled color and 5=significantly mottled color.

TABLE 5

| Sample | A | B | C | D | E | F |
|---|---|---|---|---|---|---|
| Air Pressure (p.s.i.) | 0 | 6 | 12 | 18 | 30 | 50 |
| Cube Moisture Before Drying (%) | 2.7 | 2.0 | 1.8 | 1.7 | 1.6 | 1.7 |
| Mottling Score | 5 | 3 | 2 | 2 | 1.5 | 1 |
| Cube Dissolving Time (secs) | 29 | 28 | 34 | 32 | 31 | 33 |
| Cube Hardness (Instron lbs) | 8.6 | 5.3 | 4.1 | 4.4 | 3.5 | 4.6 |

EXAMPLE 4

Use of Steam on Cubes Before Drying

Optionally, steam, conveyed through steam pipe 41 may be added to the cubes before drying. The following is an example of the use of steam as well as the benefits therefrom.

Figure 2:
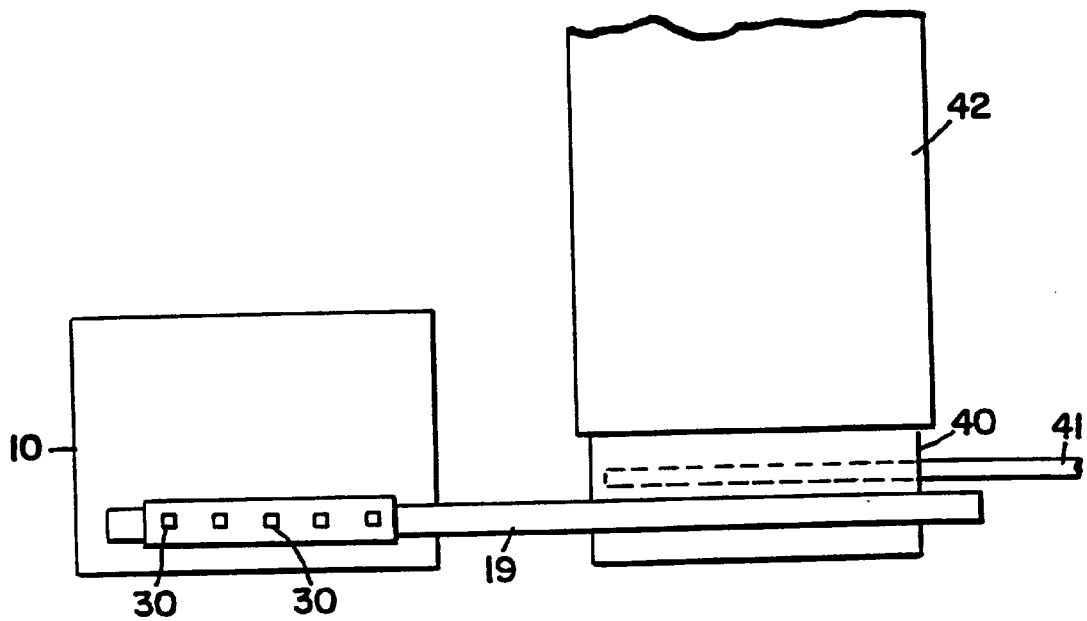
FIG. 2 is a schematic representation of the cuber with a drying tunnel having a steam pipe.
Figure 3:
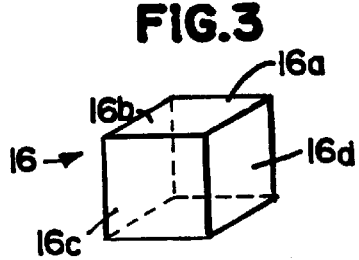
FIG. 3 is a perspective view of the die shown in FIG. 1.

The ELBA cuber was set up with the air jet set at 6 p.s.i. as in Example 3. A steam pipe with small holes drilled every inch was set under the drying tunnel conveyor between the point the cubes are transferred onto the conveyor and the beginning of the drying tunnel (FIG. 2). With steam flowing through the pipe the cubes passed through a cloud of steam before entering the drying tunnel. The steam applied a small amount of moisture uniformly to the surface of the cube which accomplished two things.

The first is the added moisture on the surface of the cube helps to make the surface color of the cube more uniform. The second is the added moisture helps make the cube harder without significantly changing the dissolving rate of the finished cube.

The process was applied to the chicken bouillon formula with sucrose and the formula in Example 2. The results are in Table 6.

TABLE 6

| Chicken Bouillon | A | B | C |
| --- | --- | --- | --- |
| Steam Flow | None | Moderate | High |
| Moisture Added (%) | 0 | 0.7 | 0.8 |
| Final Cube Moisture (%) | 1.3 | 1.0 | 1.2 |
| Mottling Score | 3 | 2 | 2 |
| Hardness (lbs) | 4.2 | 6.5 | 8.4 |
| Dissolving Time | 32 | 27 | 37 |

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method of producing a fast dissolving, low fat bouillon cube, comprising:
    (a) providing a bouillon powder, the bouillon powder having substantially no water added;
    (b) cleaning a compression surface of a punch with water, leaving a residue of water on the compression surface;
    (c) filling a die with the bouillon powder;
    (d) compressing the bouillon powder within the die with the compression surface of the punch to form a bouillon cube; and
    (e) drying the cube at an elevated temperature to form a low density fast dissolving bouillon cube.

2. The method of claim 1, wherein less than 3.3 percent water is added to the cube at the cleaning step.

3. The method of claim 2, further comprising blowing a stream of air across the compression surface to lower the amount of water added.

4. The method of claim 3, further comprising cooling the cube to approximately room temperature.

5. The method of claim 4, further comprising applying steam to the cube before drying the cube.

6. The method of claim 4, further comprising applying mist to the cube before drying the cube.

7. The method of claim 4, further comprising applying fog to the cube before drying the cube.

8. A method of producing a fast dissolving, low density bouillon cube, comprising:
    (a) filling a hopper with a free-flowing bouillon powder;
    (b) cleaning a compression surface of a punch with water, leaving a residue of water on the compression surface, the compression surface movable with a four-sided die, the surface extending out of an open top when being cleaned;
    (c) moving the compression surface to form a bottom for the die;
    (d) filling the die with the free-flowing bouillon powder from the hopper;
    (e) moving the compression surface toward the top of the die, thereby compressing the powder against a compression member to form a low density, fast dissolving bouillon cube; and
    (f) drying the cube at an elevated temperature to form a low density fast dissolving bouillon cube.

9. The method of claim 8, further comprising leaving a residue of water on the four-sided die by movement of the punch forming a bottom of the die.

10. A method of producing a fast dissolving, low density bouillon cube comprising:
    (a) applying a residue coating of water to an inside surface of a die, the inside surface defining a portion of a cavity formed by the die;
    (b) filling the cavity of the die with a free flowing bouillon powder;
    (c) applying a force of less than 3,000 pounds per square inch to the powder, thereby forming a low density, fast dissolving bouillon cube; and
    (d) drying the cube at an elevated temperature to form a low density fast dissolving bouillon cube.

11. The method of claim 10, wherein the force creates a density of less than 1.4 grams/cm$^3$ wherein the cube will dissolve in hot water in approximately 60 seconds or less.

12. The method of claim 11, wherein the density is between 1.1 to 1.2 grams/cm$^3$.

\* \* \* \* \*